United States Patent
Kallfass et al.

(10) Patent No.: US 10,351,426 B2
(45) Date of Patent: Jul. 16, 2019

(54) OXYGEN-GENERATING COMPOSITIONS COMPRISING THERMALLY TREATED (LI,FE,MG)O

(71) Applicant: DIEHL AVIATION GILCHING GMBH, Gilching (DE)

(72) Inventors: Christoph Kallfass, Schwäbisch Hall (DE); Artur Hejczyk, Berlin (DE); Ulla Simon, Berlin (DE)

(73) Assignee: Diehl Aviation Gilching GmbH, Gilching (DE)

(*) Notice: Subject to any disclaimer, the term of this patent is extended or adjusted under 35 U.S.C. 154(b) by 113 days.

(21) Appl. No.: 15/296,458

(22) Filed: Oct. 18, 2016

(65) Prior Publication Data

US 2017/0107106 A1    Apr. 20, 2017

(30) Foreign Application Priority Data

Oct. 20, 2015   (DE) .................. 10 2015 117 838

(51) Int. Cl.
*C01B 13/02*    (2006.01)
*B01J 23/02*    (2006.01)

(52) U.S. Cl.
CPC ........ *C01B 13/0218* (2013.01); *B01J 23/02* (2013.01); *C01B 13/0203* (2013.01); *C01B 13/0296* (2013.01)

(58) Field of Classification Search
CPC ........ B01J 23/002; B01J 23/02; B01J 23/745; B01J 23/78; B01J 27/128; B01J 27/138; B01J 502/226; B01J 502/328; B01J 502/33; B01J 502/338; B01J 502/34; B01J 502/344; C01B 13/0295; C01B 13/0203

See application file for complete search history.

(56) References Cited

U.S. PATENT DOCUMENTS

| | | |
|---|---|---|
| 4,073,741 A | 2/1978 | Heintz |
| 4,086,175 A | 4/1978 | Kravetz |
| 5,049,306 A | 9/1991 | Greer |
| 5,279,761 A | 1/1994 | Zhang et al. |
| 5,298,187 A | 3/1994 | Zhang et al. |
| RE3,199 E | 4/1999 | Zhang et al. |
| 6,007,736 A | 12/1999 | Zhang et al. |
| 6,030,583 A | 2/2000 | Kshirsagar et al. |
| 6,264,896 B1 | 7/2001 | Zhang et al. |
| 8,142,726 B2 | 3/2012 | Zharkov et al. |
| 9,029,286 B2 | 5/2015 | Neltner et al. |
| 2008/0185556 A1 | 8/2008 | Noble |
| 2015/0086470 A1 | 3/2015 | Kallfass |
| 2017/0107104 A1 | 4/2017 | Kallfass et al. |

(Continued)

FOREIGN PATENT DOCUMENTS

WO    9743210 A1    11/1997

OTHER PUBLICATIONS

S. Arndt, et al., "Li-doped MgO From Different Preparative Routes for the Oxidative Coupling of Methane" Top Catal. (2011) 54:1266-1285.

(Continued)

*Primary Examiner* — Melissa S Swain
(74) *Attorney, Agent, or Firm* — Laurence A. Greenberg; Werner H. Stemer; Ralph E. Locher

(57) ABSTRACT

The present disclosure provides an oxygen-generating composition comprising an oxygen source and mixed-metal oxide of formula: (Li,Fe,Mg)O, wherein said mixed-metal oxide is in at least partially crystalline form.

15 Claims, 2 Drawing Sheets preparation of oxides

(56) References Cited

U.S. PATENT DOCUMENTS

2017/0107105 A1     4/2017   Kallfass et al.
2017/0107107 A1     4/2017   Kallfass et al.

OTHER PUBLICATIONS

U. Simon et al., "Li/MgO with spin sensors as catalyst for the oxidative coupling of methane" Catalysis Communications 18 (2012) 132-136.

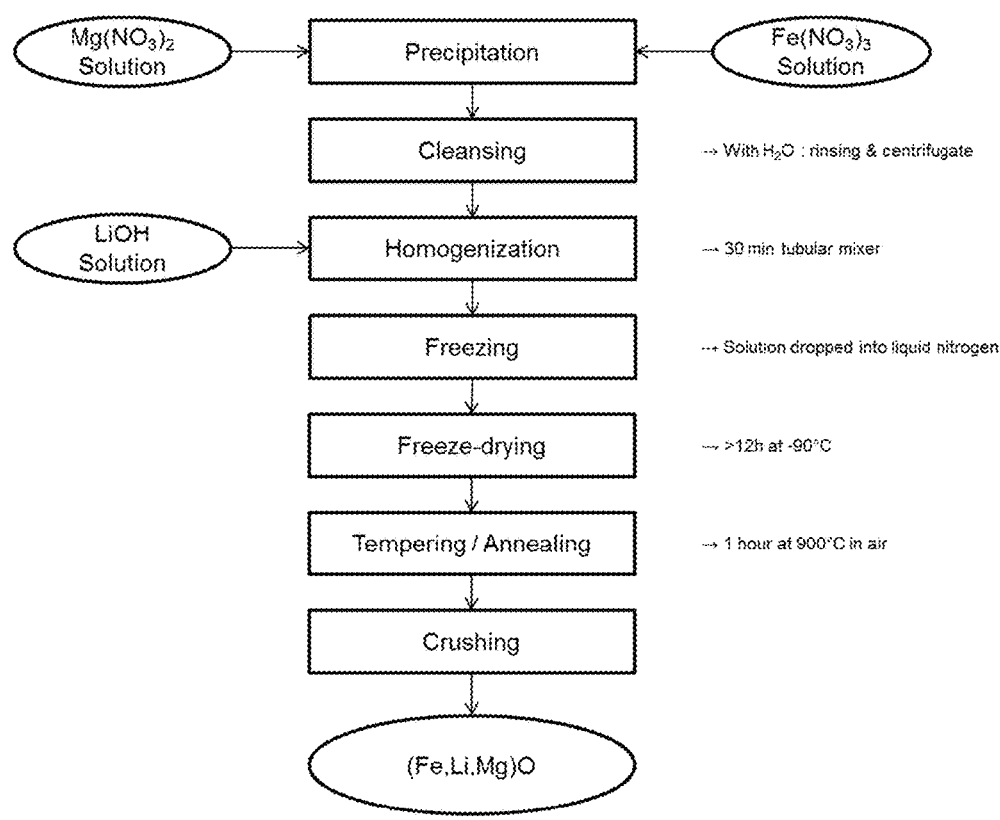
FIG. 1: preparation of oxides

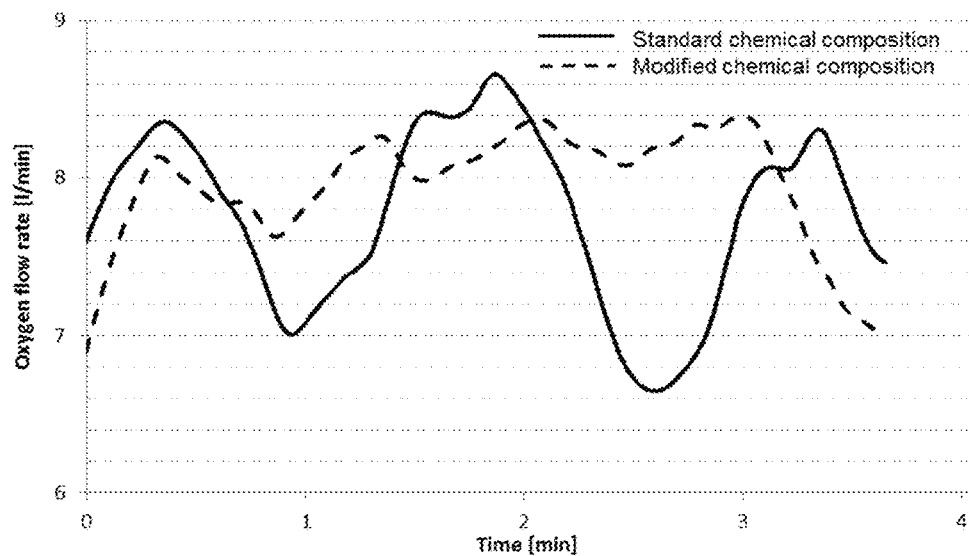
FIG. 2: Decomposition of sodium chlorate using thermally treated (Li,Fe,Mg)O
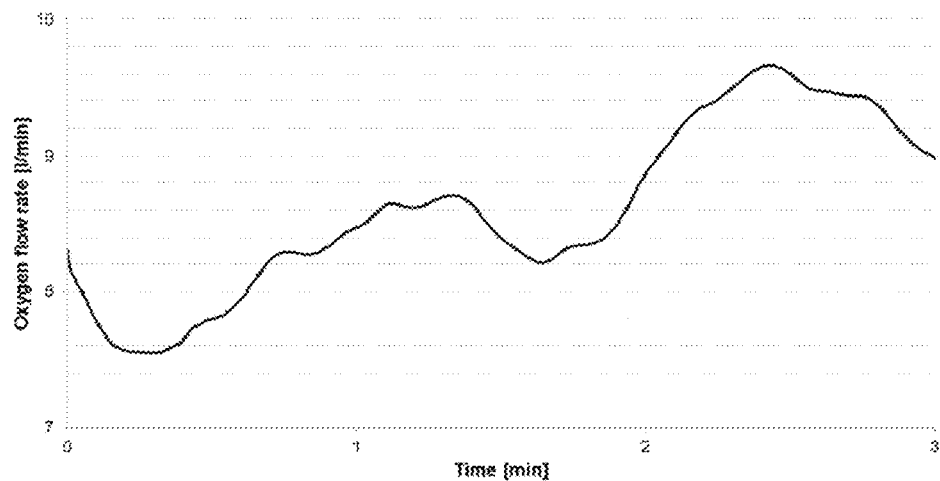
FIG. 3: Decomposition of lithium perchlorate using thermally treated (Li,Fe,Mg)O.

OXYGEN-GENERATING COMPOSITIONS COMPRISING THERMALLY TREATED (LI,FE,MG)O

FOREIGN PRIORITY

This application claims priority to German Patent Application No. 102015117838.9 filed 20 Oct. 2015, the entire contents of which is incorporated herein by reference.

TECHNICAL FIELD

The present disclosure relates to oxygen-generating compositions and devices, i.e. chemical oxygen generators, as well as methods for their preparation.

BACKGROUND

Chemical oxygen generators are used for emergency systems, e.g. in aircraft, breathing apparatus for emergency services such as fire-fighter and mine rescue crews, in submarines, and other situations in which a compact emergency oxygen generator with a long shelf life is needed. They release oxygen via a chemical reaction, typical oxygen sources being inorganic, especially alkaline metal or alkaline earth metal, superoxides, chlorates, or perchlorates.

Chlorate candles, also known as oxygen candles, are examples of chemical oxygen generators that use chlorates or perchlorates as the oxygen source. Chlorate candles can produce oxygen at a fixed rate at about 6.5 man-hours of oxygen per kilogram of the mixture and have a long shelf life.

In addition to the oxygen-delivering compounds, additives with different properties are used in chemical oxygen generators, for example: fuels, catalysts, binders and moderators. Fuels support the oxygen-producing reaction and are typically metal powders, e.g. powders of iron, tin, manganese, cobalt, nickel, tungsten, titanium, magnesium, aluminium, niobium, zirconium, and/or mixtures thereof.

Transition metal oxides are typically used to catalyse the exothermic oxygen-producing reaction, particularly to reduce the temperature at which it takes place and thus reduce the heat released by the device in action. A commonly used catalyst is cobalt oxide, due to its ability to reduce the temperature of the decomposition reaction, e.g. of sodium chlorate to 290-400° C. Cobalt oxide is however, toxic and expensive, and thus it is necessary to use it in very low amounts. Although effective at low amounts (e.g. 0.1 wt. %), achieving uniform mixing at such low concentrations is difficult. Non-uniform mixing results in erratic performance, such as non-uniform oxygen production, which is clearly undesirable. Other commonly-used catalysts are manganese oxides, although these can produce high concentrations of chlorine in the oxygen produced. There thus exists a need to provide alternative catalysts for oxygen generation which overcome these problems.

Chemical oxygen generators are required to produce an enduring and continuous oxygen flow. For this reason, moderators are also used, i.e. to avoid unwanted side reaction products like chlorine during the decomposition process and/or to ensure a sufficient and substantially uniform oxygen flow. $BaO_2$ is often used as a moderator, but this is toxic and thus disposal of scrap is expensive.

Chemical oxygen generators, i.e. chemical oxygen-generating devices, usually comprise moulds, i.e. containers or pellets which comprise the chemicals; these moulds, containers or pellets obviously need to remain structurally stable before and during use of the oxygen generator in order to avoid failure during the initial firing process and to avoid interruption of oxygen flow which could occur due to any mechanical changes of the generator body induced by environmental effects or the reaction's progress. Binders are therefore used in order to stabilise the body of the chemical oxygen generator, e.g. the chlorate candle body, and ensure that it remains safe during use. Typical binders are mica, glass powder, glass fibre, fibreglass, ceramic fibre, bentonite, kaolinite and mixtures thereof, although other inorganic binders can also be suitable. These add undesirable extra bulk to the compositions used to produce oxygen.

Decomposition of chlorates to release oxygen is exothermic, for example sodium chlorate decomposes at 500 to 600° C. Due to the high temperatures involved, chemical oxygen generators require thermal insulation to protect surrounding equipment. Such insulation adds further bulk to the oxygen generator, which is clearly undesirable as they may need to be stored for long periods, usually in locations (e.g. aircraft, submarines, fire engines) where space and weight capacity are limited. There is thus a need to reduce the size and/or weight of oxygen generators.

The present inventors have surprisingly found that certain oxide compounds are multi-functional, acting as moderator, binder and fuel. These compounds therefore enable the production of lighter and more compact oxygen generators. Moreover, as the compounds are non-toxic, the above-mentioned problems with commonly used toxic moderators are also avoided.

Thus, viewed from a first aspect, the present disclosure provides an oxygen-generating composition comprising an oxygen source and mixed-metal oxide of formula: (Li,Fe,Mg)O, wherein said mixed-metal oxide is in at least partially crystalline form (i.e. is at least partially crystalline).

The required degree of crystallinity can be achieved by thermal treatment, e.g. calcination, of mixed-metal oxides of formula: (Li,Fe,Mg)O. The mixed-metal oxide of formula: (Li,Fe,Mg)O is therefore preferably thermally treated or calcined, e.g. prior to being used to produce the oxygen generating compositions herein described. Viewed from a further aspect, the present disclosure provides an oxygen-generating composition comprising an oxygen source and a thermally treated (or calcined) mixed-metal oxide of formula: (Li,Fe,Mg)O.

Preferably at least 25% (e.g. wt. %), especially preferably at least 50%, particularly at least 75% or at least 90% of the mixed-metal oxide material described herein is crystalline. Especially preferably the mixed-metal oxide of formula: (Li,Fe,Mg)O is substantially crystalline.

Crystallinity can be measured using X-ray diffraction (XRD) or any other techniques known in the art, such as differential scanning calorimetry. Crystallinity involves both a short-range and long-range order of periodically occurring atoms inside the crystal lattice which results in characteristic well-defined X-ray powder patterns. In contrast, mixed-metal oxides of formula: (Li,Fe,Mg)O which have not been subjected to thermal treatment exhibit low degrees of crystallinity and can be referred to as amorphous or semi-crystalline. Such materials contain only short-range order of the atoms which results in undefined X-ray powder patterns which lack the significant reflexes found for more crystalline forms.

Preferably the mixed-metal oxide as herein described is in the form of a powder. Especially preferably the mixed-metal oxide is in the form of nano-particles, e.g. a nano-particulate powder.

The notation "(Li,Fe,Mg)O" is intended to denote a single chemical entity, rather than, for example, a mixture of lithium oxide(s), iron oxide(s) and magnesium oxide(s). The compositions of the present disclosure therefore comprise a mixed-metal lithium-iron-magnesium oxide, rather than a mixture of these metal oxides. The oxides of the present disclosure can therefore be viewed as Li- and Fe-doped MgO, i.e. MgO in which some magnesium cations are substituted by iron cations and lithium cations in the crystal lattice. Although the oxide could be doped FeO, doping of MgO is, however, most preferred. In the oxides of the present disclosure, iron typically has an oxidation state of +2 and/or +3.

The content of each element may be determined by standard techniques, e.g. atomic absorption spectroscopy or inductively coupled plasma atomic emission spectroscopy. Preferred examples of the mixed-metal oxides of the present disclosure are (Fe,Li,Mg)O, where the iron and lithium contents are independently 0.01 to 30 Atom % (at. %), especially 0.05 to 20 at. % (e.g. 0.1 to 10 or 0.1 to 1 at. %), especially preferably 0.1 to 0.5 at. %, e.g. around 0.45 at. %.

An alternative notation would be $(Fe_x,Li_y,Mg_{1-x-y})O$, where x and y are independently preferably 0.0002 to 0.6; especially 0.001 to 0.4, especially preferably 0.002 to 0.01, e.g. around 0.009. Especially preferably x=y, i.e. Li and Fe are substantially equimolar.

Thermal treatment below <1050° C. does not change the relative proportions of the metals.

The inventors have developed a process for producing the mixed-metal oxides of the present disclosure in nano-particulate form. The use of (or method of using) such nano-particles in oxygen production, e.g. as binders, fuels and/or catalysts/moderators in oxygen production, forms a further novel aspect of this disclosure. Thus, in a preferred aspect, the mixed-metal oxides herein described are in the form of particles having a diameter (e.g. the average particle diameter) of less than or equal to 500 nm, preferably less than or equal to 300 nm, especially less than or equal to 200 nm. Smaller particles allow for better mixing in oxygen-generating compositions and thus more uniform oxygen production.

The mixed-metal oxides of the present disclosure may be characterised using standard techniques, such as surface area analysis, absorption spectroscopy, inductively coupled plasma atomic emission spectroscopy, X-ray diffraction, electron paramagnetic resonance nuclear magnetic resonance, scanning electron microscopy and/or transmission electron microscopy.

The specific surface area of the mixed-metal oxide materials of the present disclosure may be determined using standard techniques, e.g. a Surface Area Analyzer with surface areas calculable by the method of Brunauer, Emmett and Teller. Typical BET surface areas are 5 to 50 m2/g, e.g. 10 to 40 m2/g, especially 25 to 35 m2/g.

Characterisation of the oxides by X-ray diffraction (XRD) is possible using standard techniques, e.g. CuK$\alpha$ radiation, with a wavelength 0.154 nm.

EPR experiments may be performed in conventional continuous wave (cw) as well as in pulsed mode.

In some aspects, the mixed-metal oxide can form up to 70 wt. % of the oxygen-generating composition, i.e. the composition may comprise 0.1 to 70 wt. %, preferably 0.1 to 10 wt. %, particularly preferably 0.2 to 5 wt. %, e.g. 1 to 2 or 2 to 4 wt. %, especially around 3 wt. % mixed-metal oxide as herein described, where the amount of mixed-metal oxide is expressed as weight percent of the oxygen-generating composition as a whole (i.e. regarding the total weight of the oxygen source, mixed-metal oxide and any other components).

The oxygen source may be any compound suitable for producing breathable oxygen. Metal (especially alkali metal or alkaline earth metal) halogenates (especially chlorates, perchlorates or mixtures thereof), peroxides or superoxides are suitable, especially those of lithium, sodium or potassium, e.g. KO2. Preferably the oxygen source is, or comprises, one or more compounds selected from alkali metal chlorates, alkali metal perchlorates, alkaline earth metal chlorates, alkaline earth metal perchlorates and mixtures thereof, especially preferably alkali metal chlorates and/or alkali metal perchlorates. Particularly preferred oxygen sources are those comprising sodium or lithium, particularly sodium chlorate and lithium perchlorate, e.g. the oxygen source is preferably sodium chlorate and/or lithium perchlorate.

The oxygen-generating composition of the disclosure typically comprises 30 to 99.9 wt. % oxygen source, preferably 40 to 99 wt. %, especially preferably 70 to 99 wt. %, e.g. at least 80 wt. %, or at least 95 wt. %, especially 90 to 99.9 wt. % where the amount of oxygen source is expressed as weight percent of the oxygen-generating composition as a whole (i.e. regarding the total weight of the oxygen source, mixed-metal oxide and any other components).

It is a particularly preferred aspect of all embodiments of this disclosure that the oxygen produced is breathable, e.g. without further treatment.

As discussed further in the Examples, it has been surprisingly found that the mixed-metal oxides of the present disclosure are multifunctional, acting as a moderator as well as a fuel and binder. Thus, there is no need for additional fuel, binder, catalyst or moderator components in the oxygen-generating compositions of the present disclosure. This means that the compositions are simpler, quicker and cheaper to produce than conventional oxygen-generating compositions and that they are more compact and weigh less than those of the prior art (which require separate fuel, binder, catalyst and/or moderator components). This results in lighter and more compact oxygen-generators, e.g. chlorate candles. Yet further space and cost savings are enabled by the reduction in thermal insulation required for oxygen generators using the compositions of the present disclosure—less insulation being required due to a reduction in temperature of the oxygen-producing reaction due to the catalytic properties of the mixed-metal oxides disclosed herein. Moreover, the mixed-metal oxides of the present disclosure are non-toxic and enable more uniform oxygen production due to the more efficient mixing possible due to their nano-particulate nature.

For example, as shown in FIG. 2 and Example 2, thermally treated (Li,Fe,Mg)O enables a more uniform flow of oxygen at a higher rate in comparison to a commercially available chlorate candle of similar size and weight. The mixed-metal oxide of the present disclosure therefore performs better than standard moderator compositions at controlling oxygen flow rate. Furthermore, the mixed-metal oxide of the present disclosure also acts as a binder and fuel, thus removing the need for further components to perform these functions and is non-toxic.

Due to the multi-functional nature of the oxides herein described, the oxygen-generating compositions do not require the presence of separate fuels, catalysts, moderators or binders. Preferably the compositions as herein described therefore consist of, or consist essentially of the (one or more, preferably one) oxygen source and (one or more, preferably one of the) mixed-metal oxide described herein. However, although the compositions of the present disclosure do not require the presence of further components, one or more additional components may be present. Thus, one aspect of the present disclosure relates to the compositions as herein described additionally comprising one or more additives, e.g. fuels, catalysts, moderators and/or binders.

Thus, the compositions as herein described may further comprise one or more fuels. Metals or non-metals such as silicon, boron and/or carbon may be used. Preferably the fuel is in powder form, especially a metal powder, e.g. a powder of, or comprising, iron, tin, manganese, cobalt, nickel, tungsten, titanium, magnesium, aluminium, niobium or zirconium and/or mixtures thereof. The compositions may optionally comprise 0 to 5 (e.g. 0.1 to 5) wt. % of such fuel (expressed as the weight percentage of the total weight of additional fuels as part of the composition as a whole), preferably 0 to 1 (e.g. 0.1 to 1) wt. %, especially 0 to 0.5 (e.g. 0.1 to 0.5) wt. %.

The compositions as herein described may further comprise one or more catalysts, e.g. a transition metal oxide, preferably selected from manganese oxides (e.g. MnO, $Mn_2O_3$), iron oxides (e.g. FeO and/or $Fe_2O_3$) cobalt oxide, copper oxide, nickel oxide and mixtures thereof. The compositions may optionally comprise 0 to 5 (e.g. 0.1 to 5) wt. % of such catalyst (expressed as the weight percentage of the total weight of additional catalysts as part of the composition as a whole), preferably 0 to 1 (e.g. 0.1 to 1) wt. %, especially 0 to 0.5 (e.g. 0.1 to 0.5) wt. %.

The compositions as herein described may further comprise one or more moderators, e.g. chlorine removers and/or reaction rate modifiers (e.g. inhibitors). These are preferably selected from the oxides, peroxides and hydroxides of alkali and alkaline earth metals, preferably barium peroxide. These compounds serve for binding chlorine and carbon dioxide, which are sometimes produced in trace amounts, but should not be present in breathable oxygen. They can also moderate the production of oxygen, ensuring a uniform supply. The compositions may optionally comprise 0 to 5 (e.g. 0.1 to 5) wt. % of such moderators (expressed as the weight percentage of the total weight of additional moderators as part of the composition as a whole), preferably 0 to 1 (e.g. 0.1 to 1) wt. %, especially 0 to 0.5 (e.g. 0.1 to 0.5) wt. %.

The compositions as herein described may further comprise one or more binders, preferably selected from inorganic binders such as mica, glass powder, glass fibre, fibreglass, ceramic fibre, steel wool, bentonite, kaolinite and mixtures thereof, for example, although other inorganic binders can also be suitable.

The oxygen-generating compositions as herein described may be made by combining the oxygen source with the mixed-metal oxide (and any other optional components). The disclosure therefore also provides a method for preparing an oxygen-generating composition as herein described, said method comprising combining the oxygen source with the mixed-metal oxide. Optionally the oxygen source is mixed with, e.g. 1-5 wt. %, water prior to being combined with the mixed-metal oxide. If any of the additional components mentioned herein are desired to be present in the composition, these would typically be mixed together with the mixed-metal oxide, preferably prior to combination with the oxygen source. The components may be combined by any suitable method, e.g. mixing. After the components have been combined, the resulting oxygen-generating composition may be dried and stored for future use, or placed in a mould to form part of an oxygen generator.

The mixed-metal oxide of the present disclosure may be prepared by any known route. Suitable routes for the manufacture of oxides of this type are found in Top. Catal. (2011) 54; 1266-1285. Most preferably, the mixed-metal oxide is prepared by co-precipitation, e.g. by adding aqueous solutions of salts such as $Mg(NO_3)_2.6H_2O$ and $Fe(NO_3)_3.9H_2O$ to a solution, preferably an ammonia solution (preferably at a pH of 11 or above) to precipitate a semi-crystalline powder, which is then further mixed with $LiOH.H_2O$.

Other metal salts, e.g. chlorides or phosphates may be used for the precipitation step, but nitrates are especially preferred as they are completely removable by thermal treatment. Similarly, ammonia is the preferred medium for precipitation. If chlorides are used, the precipitate may need to be extensively washed to avoid the presence of chlorine.

In order to produce nano-particles, the resulting material may be quick-frozen using liquid $N_2$, followed by freeze-drying, e.g. for over 12 hours, especially over 72 hours. The combination of precipitation, freezing and freeze-drying produces homogenous, high purity nano-particles.

In order to increase the degree of crystallinity, the material is thermally treated (e.g. calcined/calcinated), e.g. heated. Thermal treatment is preferably for 1 to 10 hours, preferably 5 to 10 hours, preferably at a temperature of 500 to 1000° C., especially 800 to 1000° C., for example at 900° C., e.g. for 1 hour. MgO crucibles are particularly suitable for the thermal treatment step. As the temperatures of this treatment are above those of the oxygen-production reaction, no thermal treatment takes place when producing oxygen with the compositions of the disclosure. The crystalline nature of the oxides mentioned herein therefore refers to that before oxygen production, i.e. partial crystallinity of the oxide is already present in the oxygen producing composition and does not merely arise during the eventual oxygen producing reaction.

Decomposition of the oxygen source of the compositions of the present disclosure results in oxygen production. Thus, viewed from a further aspect, the present disclosure provides the use of a mixed-metal oxide as herein described in a method for generating oxygen. The present disclosure also provides use of the mixed-metal oxides as herein described as multi-functional components in oxygen-generating compositions and oxygen generators, i.e. a single component with the functions of moderator, binder and fuel. A further aspect of the present disclosure relates to a method for generating oxygen, said method comprising decomposing an oxygen source as herein described in the presence of a mixed-metal oxide as herein described.

The compositions of the present disclosure have utility in chemical oxygen generators, also referred to as "chemical oxygen generating devices", "chemical oxygen systems", "chemical oxygen generating systems", "oxygen-generators" etc.

Thus, viewed from a further aspect, the present disclosure provides a chemical oxygen generator comprising an oxygen-generating composition as herein described. Preferably, said generator comprises a container for containing the oxygen-generating composition and a primer for starting decomposition of the oxygen-generating composition.

Typical chemical oxygen generators/devices according to the present disclosure are fixed chemical oxygen generators and portable chemical oxygen generators. Especially preferably the chemical oxygen generator is, or comprises, a chlorate candle.

Fixed chemical oxygen generators are used in fixed systems, e.g. those commonly used in passenger-carrying aircraft. The system typically comprises boxes, each carrying an oxygen generator and one or more passenger masks. The generators are activated as the masks are presented. Thus, the present disclosure also provides the use of the compositions and generators as herein described in a fixed oxygen generation system, e.g., an aircraft oxygen generation system. The present disclosure also provides a method for producing oxygen, e.g. in an aircraft, comprising use of the compositions and generators as herein described.

Aircraft typically carry one or more oxygen generating systems selected from continuous flow systems, demand flow systems, diluter demand systems and pressure demand systems. The generators and compositions of the present disclosure may be used in any such system. Thus, a further aspect of the disclosure provides an oxygen generating system, preferably an aircraft oxygen generating system, comprising a chemical oxygen generator or oxygen generating compositions as herein described.

The present disclosure also provides a kit for making an oxygen-generating composition as herein described or a kit for making a chemical oxygen generator as herein described, said kit comprising an oxygen source as herein described and a mixed-metal oxide as herein described.

Chemical oxygen-generating devices such as chlorate candles typically have a generally cylindrical shape with a taper, with a recess at one end to hold an ignition pellet. A typical candle configuration is shown in FIG. 1 of SAE AIR1133. The ignition pellet may be ignited by firing a primer. The heat from the ignition pellet then ignites the reaction of the candle body and generates oxygen. The oxygen-generating devices of the present disclosure therefore preferably further comprise an ignition pellet and/or primer. Suitable pellets and primers are known in the art.

The oxygen-generator, e.g. candle, may comprise several layers of different compositions and thus different reaction rates. Multiple layers can be used to help match the oxygen generation requirements. Different applications have different oxygen generation requirements. The interface shapes and relative sizes and reactivities of the layers can be modified, depending upon the requirements of the specific applications of the oxygen-generating device.

The oxygen-generating devices of the present disclosure may therefore comprise compositions in addition to the oxygen-generating composition as herein described. Alternatively, the devices could comprise a plurality of layers comprising the same or different compositions according to the present disclosure, e.g. layers comprising oxygen-generating compositions as herein described which differ from one another in one or more aspects such as: the identity/amount of the oxygen source; the identity (e.g. specific proportion of metals in the oxide and/or degree of crystallinity)/amount of mixed-metal oxide present; and/or the amount and/or identity of any optional components as herein described.

Formation of devices according to the present disclosure may be achieved by preparing the mixed-metal oxide by any of the methods referred to herein and separately mixing the oxygen source with approximately 1 to 5 wt. % water (the water being used as a lubricant to facilitate the formation of the oxygen-generating cores or candles). The mixed-metal oxide is then mixed with the wet oxygen source. The oxygen-generating device, e.g. oxygen-generating candle, may be formed by compaction of the damp mixture in a mould, which is then dried, e.g. at about 120° C., to remove the water that was added during the mixing process.

It will be appreciated that the disclosed uses and methods may take advantage of any of the materials described above in relation to the compositions and products and vice versa.

All references herein to "comprising" should be understood to encompass "including" and "containing" as well as "consisting of" and "consisting essentially of".

BRIEF DESCRIPTION OF THE DRAWINGS

One or more non-limiting examples will now be described, with reference to the accompanying drawings, in which:

FIG. 1 shows a flow-chart outlining the method for preparing the mixed-metal oxides of the present disclosure as described further in Example 1.

FIG. 2 shows decomposition of sodium chlorate using thermally treated (Li,Fe,Mg)O, according to Example 2.

FIG. 3 shows decomposition of lithium perchlorate using thermally treated (Li,Fe,Mg)O, according to Example 3.

As shown in FIG. 1, mixed-metal oxides according to the present disclosure can be formed by precipitation. An aqueous solution of $Mg(NO3)2.6H2O$ is prepared by dissolving $Mg(NO3)2.6H2O$ in distilled $H2O$. A solution of $Fe(NO3)3.9H2O$ is prepared in the same way. The nitrate solutions are concurrently added drop-wise to a stirred ammonia solution while keeping the pH value above 11. The gelatinous precipitates can be separated by centrifugation and rinsed with distilled $H2O$ in a "cleansing" step. In order to incorporate Li into the mixed-metal oxide, the resulting precipitate is mixed with an aqueous LiOH solution (LiOH.xH2O) with appropriate Li concentrations (chosen to influence the amount of Li in the eventual oxide) in a tubular mixer and homogenised. In order to produce nano-powder, the suspension can be quick-frozen using liquid nitrogen. Afterwards, it may be freeze-dried over at least 12 hours using a freeze-dryer. The combination the above mentioned precipitation, quick-freezing and freeze-drying steps produces nano-particles. Optionally a further crushing step may be used, although the method allows production of nano-particles without any crushing step.

In order to produce a thermally treated/crystalline oxide, the material is then heated, e.g. at 900° C. for 1 hour in MgO crucibles.

It will be understood that the description above relates to a non-limiting example and that various changes and modifications may be made from the arrangement shown without departing from the scope of this disclosure, which is set forth in the accompanying claims.

The disclosure will now be further described by way of the following non-limiting Examples:

EXAMPLE 1

Preparation of Mixed-Metal Oxides

Aqueous solutions of $Mg(NO3)2.6H2O$ were prepared by dissolving $Mg(NO3)2.6H2O$ in distilled $H2O$. A solution of $Fe(NO3)3.9H2O$ was prepared in the same way. The nitrate solutions were concurrently added drop-wise to a stirred ammonia solution while keeping the pH value above 11. The gelatinous precipitates were rinsed with distilled $H_2O$ and mixed with aqueous LiOH solution (LiOH.1H2O) with appropriate Li concentrations (chosen to influence the amount of Li in the eventual oxide) in a tubular mixer.

Finally, the solution was quick-frozen using liquid N2. Afterwards, it was freeze-dried over at least 72 hours using a freeze-dryer. (Li,Fe,Mg)O semi-crystalline powders were produced.

After thermal treatment at 900° C. for 1 h in MgO crucibles, crystalline (Li,Fe,Mg)O powders were produced. Crystallinity was greater than 50%. The ratio of Li:Fe:Mg is determined by preparation process.

The Li-content of the different samples was quantified via atomic absorption spectroscopy, using an AASNovAA400G device from Analytik Jena via flame. The Fe content was determined via inductively coupled plasma atomic emission spectroscopy, using a Horiba Scientific ICP Model Ultima 2. The specific surface area was determined by a Micromeritics Gemini III 2375 Surface Area Analyzer, using N2 adsorption at −196° C. Before measuring, the samples were degassed at 300° C. and 0.15 mbar at least for 30 minutes. The surface areas were calculated by the method of Brunauer, Emmett and Teller. Powder X-Ray diffractograms were obtained (CuK$\alpha$1 radiation, with a wavelength 0.154 nm) using a Bruker AXS D8 ADVANCE X-ray diffractometer. EPR experiments were performed with a BRUKER E680 spectrometer. The spectrometer was operated in conventional continuous wave (cw) as well as in pulsed mode. Data were taken from "as prepared" compounds.

In Table 1 an overview over the target and the actual loading of Li and the Fe-content, the BET surface area and the present phases, detected via XRD is given. The intended and the loading of Li and Fe of the prepared catalysts agree very well. The ratio Fe/Li is in both cases near 1 and the BET surface area does not vary too strongly. The Fe—Li/MgO sample showed solely the XRD peaks of the MgO phase indicating an entire incorporation of the Li and Fe ions in MgO ($Fe^{3+}$, ionic radius: 55 pm for coordination number 6). The peak positions of the MgO pattern were marginally affected. An overview of the detected phases is shown in Table 1.

TABLE 1

Li and Fe-content of the catalyst, the ratio dopant (Fe) to Li, the specific surface area, determined before reaction, the sample colour and the detected phases.

| Catalyst | Target-content Li [at. %] | Target-content Fe [at. %] | Measured content Li [at. %] | Measured content Fe [at. %] | Atom ratio [Fe/Li] | BET [m$^2$/g] | Colour | XRD phases |
|---|---|---|---|---|---|---|---|---|
| Fe—Li/MgO | 0.5 | 0.5 | 0.5 | 0.5 | 1 | 29 | Light yellow | MgO |

Co-doping of Li/MgO catalysts with charge compensating Fe ions was therefore performed with a constant atomic ratio of Li to dopant of approximately 1:1. These aliovalent Fe ions turned out to occupy Mg2+ sites in the lattice. The solubility of $Fe^{3+}$ in MgO was shown to be unlimited. The anticipated Li stabilization by co-doping Li/MgO with $Fe^{3+}$ appears to take place. As shown in the following Examples, the co-doping results in active catalytic materials.

EXAMPLE 2

Decomposition of Sodium Chlorate Using Thermally Treated (Li,Fe,Mg)O

Thermally treated nano-sized non-toxic (Li,Fe,Mg)O (Li 0.5 at. %; Fe 0.5 at. %) was prepared according to Example 1. It was combined with sodium chlorate (98.7 wt. % sodium chlorate and 1.3 wt. % oxide) by dry mixing (any method) and subsequently uniaxial pressed to form a chlorate candle of comparable size and weight to those commercially available. Production of oxygen via decomposition of sodium chlorate in the presence of the thermally treated (Li,Fe,Mg)O was monitored and compared to a commercially available chlorate candle of comparable size and weight. As shown in FIG. 2, the oxygen flow rate using the thermally treated (Li,Fe,Mg)O ("modified"; dashed line; gas flow: 7.6 to 8.4 L/min, i.e. in line with industry recommendations that oxygen flow is ≥4 litres per minute) was significantly smoother and at a higher rate than that achieved using the commercially available candle ("standard"; solid line; gas flow: 6.6 to 8.6 L/min). Moreover, the mixed-metal oxide of the present disclosure also acts as a binder and fuel, thus removing the need for further components to perform these functions and is non-toxic.

EXAMPLE 3

Decomposition of Lithium Perchlorate Using Thermally Treated (Li,Fe,Mg)O

Thermally treated nano-sized non-toxic (Li,Fe,Mg)O (Li 0.5 at. %; Fe 0.5 at. %) was prepared according to Example 1. It was combined with lithium perchlorate (98.7 wt. % lithium perchlorate and 1.3 wt. % oxide) by dry mixing. Production of oxygen via decomposition of lithium perchlorate in the presence of the thermally treated (Li,Fe,Mg)O was monitored and is shown in FIG. 3. Although the candle used was smaller than commercially available candles, the oxygen flow rate using the thermally treated (Li,Fe,Mg)O was 7.6 to 9.7 L/min, i.e. in line with industry recommendations that oxygen flow is ≥4 litres per minute and was relatively smooth. Moreover, the mixed-metal oxide of the present disclosure also acts as a binder and fuel, thus removing the need for further components to perform these functions and is non-toxic.

The invention claimed is:

1. An oxygen-generating composition comprising: an oxygen source; and
   a mixed-metal oxide of formula: (Li,Fe,Mg)O, wherein said mixed-metal oxide is in at least partially crystalline form.

2. The composition as claimed in claim 1, wherein said mixed-metal oxide is a thermally treated oxide.

3. The composition as claimed in claim 1, wherein at least 50% of the mixed-metal oxide is crystalline.

4. The composition as claimed in claim 1, wherein said mixed-metal oxide comprises 0.1 to 1.0 at. % Fe and 0.1 to 1.0 at. % Li.

5. The composition as claimed in claim 1, wherein said mixed-metal oxide is in the form of nano-particles.

6. The composition as claimed in claim 5, wherein said nano-particles have a diameter of less than or equal to 500 nm.

7. The composition as claimed in claim 1, wherein said oxygen source is selected from alkali metal chlorates, alkali metal perchlorates, alkaline earth metal chlorates, alkaline earth metal perchlorates and mixtures thereof.

8. The composition as claimed in claim 1, wherein said oxygen source comprises sodium chlorate and/or lithium perchlorate.

9. The composition as claimed in claim 1, wherein said composition consists essentially of said oxygen source and said mixed-metal oxide.

10. The composition as claimed in claim 1, wherein 90 to 99.9 wt. % of said composition is said oxygen source.

11. The composition as claimed in claim 1, wherein 0.1 to 10 wt. % of said composition is said mixed-metal oxide.

12. A method for generating oxygen, said method comprising decomposing an oxygen source in the presence of a mixed-metal oxide of formula: (Li,Fe,Mg)O, wherein said mixed-metal oxide is in at least partially crystalline form.

13. A chemical oxygen-generator comprising an oxygen-generating composition as claimed in claim 1.

14. The chemical oxygen-generator as claimed in claim 13 wherein said generator comprises a container for containing the oxygen-generating composition and a primer for starting decomposition of the oxygen-generating composition.

15. The chemical oxygen-generator as claimed in claim 13 wherein said chemical oxygen-generator is a chemical oxygen candle.

\* \* \* \* \*